United States Patent [19]
Corte et al.

[11] 3,916,193
[45] Oct. 28, 1975

[54] RADIATION FLUX MEASURING DEVICE
[75] Inventors: Ernesto Corte, La Jolla, Calif.; Pradeep Maitra, New Delhi, India
[73] Assignee: General Atomic Company, San Diego, Calif.
[22] Filed: Aug. 31, 1973
[21] Appl. No.: 393,444

[52] U.S. Cl. ............... 250/336; 250/392; 328/145
[51] Int. Cl. .............................................. G01t 1/00
[58] Field of Search ........... 250/336, 390, 391, 392; 328/145

[56] References Cited
UNITED STATES PATENTS

| | | | |
|---|---|---|---|
| 2,600,423 | 6/1952 | Nolle | 328/145 |
| 3,500,198 | 3/1970 | Kaiser et al. | 328/145 |
| 3,562,552 | 2/1971 | Baudino | 328/145 |
| 3,663,833 | 5/1972 | Pao et al. | 328/145 |
| 3,668,428 | 6/1972 | Koerner | 328/144 |
| 3,683,275 | 8/1972 | Fowler | 328/145 |

*Primary Examiner*—Harold A. Dixon
*Attorney, Agent, or Firm*—Fitch, Even, Tabin & Luedeka

[57] ABSTRACT

A radiation flux measuring device is described which employs an attenuator circuit, the output of which is maintained constant, connected to a radiation detector. Means connected to the attenuator circuit produce an output representing the log of the a-c component of the radiation detector, thereby providing a true root mean square logarithmic output.

3 Claims, 4 Drawing Figures

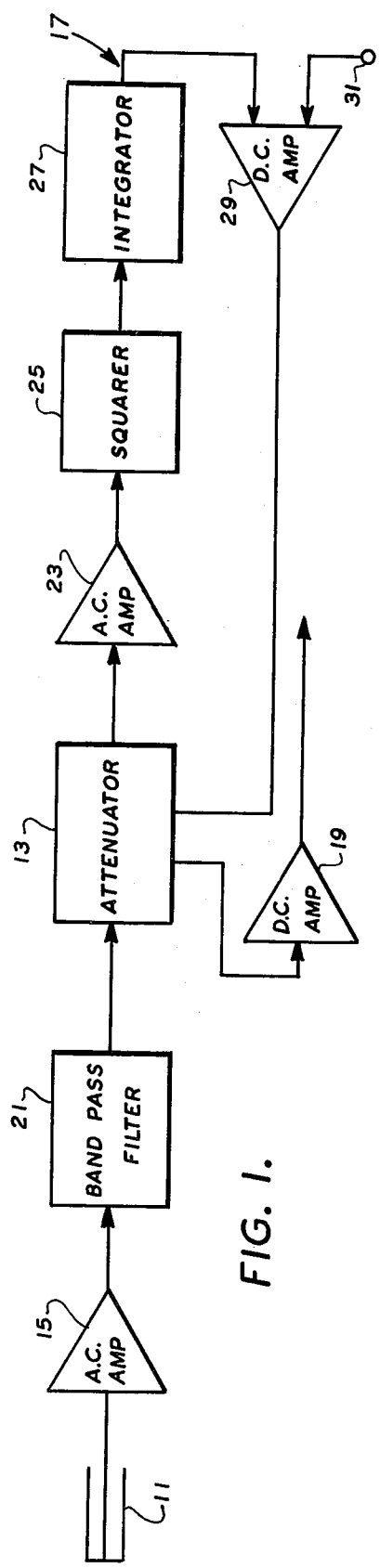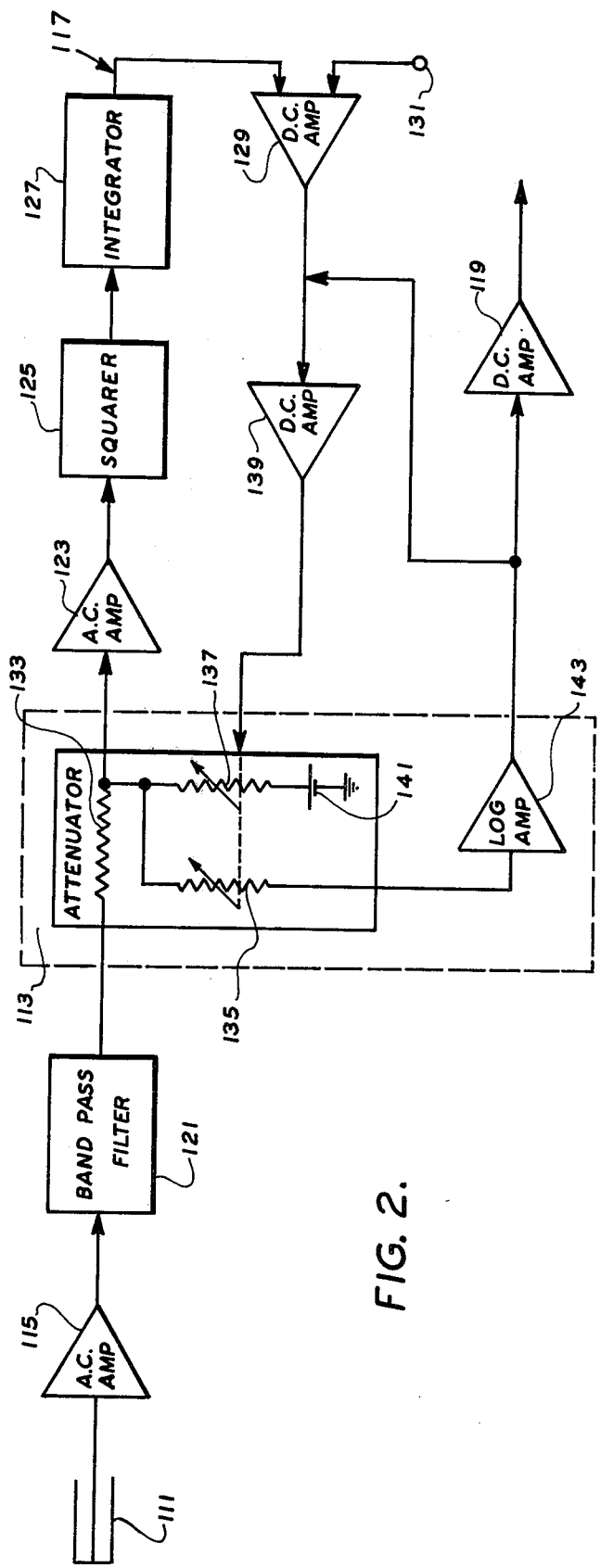
FIG. 1.
FIG. 2.

RADIATION FLUX MEASURING DEVICE

This invention relates to the measurement of radiation flux and, more particularly, to a radiation flux measuring device which utilizes the statistical fluctuations of a radiation detector as a measure of radiation flux.

In the measurement of radiation flux, the simple expedient of counting pulses representative of nuclear particles is often inadequate. At high radiation flux rates, counting techniques are incapable of achieving the resolution necessary to accurate flux measurement.

A flux measuring technique which may be successfully used for relatively high radiation flux rates utilizes the statistical fluctuations or a-c component in the signal from a radiation detector as a measure of radiation flux. The mean square voltage of the statistical or a-c signal is proportional to the radiation flux. In order to cover a wide range, devices employing this technique have typically utilized an output representative of the logarithm of the root mean square voltage of the statistical signal.

Prior art devices of the type described have often employed direct log conversion of the statistical signal output of the radiation detector, such as by the utilization of a-c or d-c logarithmic feedback amplifiers. This type of circuitry tends to be complex and therefore relatively expensive. Because of the complexity, some inaccuracy may be inherent in such devices. Moreover, many radiation flux measuring devices of the prior art do not provide a logarithmic output representative of the true root mean square output of the radiation detector.

It is an object of the present invention to provide an improved radiation flux measuring device.

Another object of the invention is to provide an improved radiation flux measuring device which utilizes the statistical fluctuations of a radiation detector as a measure of radiation flux.

It is another object of the invention to provide a radiation flux measuring device of the type described which provides a logarithmic output representing the true root means square of the statistical fluctuations of a radiation detector.

It is another object of the invention to provide a radiation flux measuring device which is relatively low in cost and reliable of construction.

Other objects of the invention will become apparent to those skilled in the art from the following description, taken in connection with the accompanying drawings wherein:

FIG. 1 is a schematic block diagram of a radiation flux measuring device constructed in accordance with the invention;

FIG. 2 is a schematic block diagram illustrating, in greater detail, one form of the device of FIG. 1;

Figure 3:
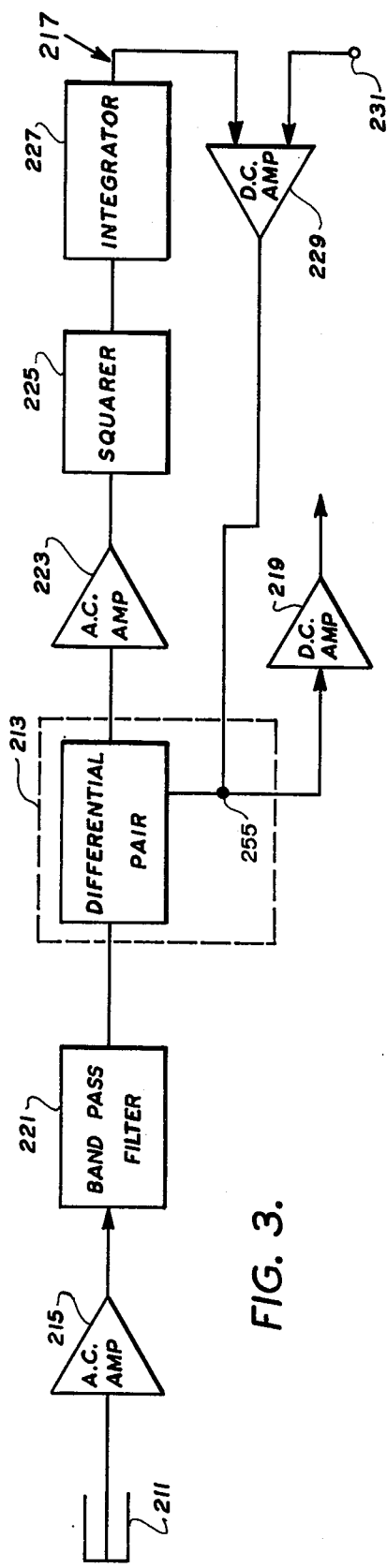
FIG. 3 is a schematic block diagram illustrating in detail another form of the device of FIG. 1.

Very generally, the radiation flux measuring device of the invention comprises a radiation detector 11 for producing an output having an a-c component representing radiation flux. An attenuator circuit 13 is also provided, and means 15 apply the a-c component of the radiation detector to the attenuator circuit. A feedback circuit 17 maintains the output of the attenuator circuit constant. Means 19 are coupled to the attenuator circuit for deriving a signal representing the log of the a-c component.

Referring now more particularly to FIG. 1, a general form of the device of the invention is illustrated. The radiation detector 11 may be any suitable type of detector such as a fission chamber. As is known to those skilled in the art, a fission chamber comprises a pair of electrodes arranged in a suitable configuration across which a d-c bias voltage is maintained. The surfaces of the electrodes are coated with U 235 and an incident thermal neutron will produce two fission fragments of considerable energy. When one of these fission fragments crosses the gap between the electrodes, as is highly probable, an ionized track is produced extending between the electrodes. The electric field produced by the bias voltage between the electrodes causes the electrons and positive ions to be accelerated across the gap, thereby producing a current pulse.

The average number of current pulses per second produced in the radiation detector 11 is proportional to the radiation flux. The time between pulses, however, follows a statistical distribution about the average time. By using the statistical fluctuations of the signal, namely, the a-c component of the output of the radiation detector, the mean square voltage of the statistical signal will provide an indication of the radiation flux.

In the device illustrated in FIG. 1, the radiation detector 11 is connected to an a-c amplifier or preamplifier 15. The output of the preamplifier is passed through a band pass filter 21 which limits the signal to a band. This band is optimized to minimize processing error in the following circuitry and to achieve the required signal response. The band limited signal from the band pass filter is then passed into an attenuator 13. As will be explained, the attenuator may be any of several types of circuits which may be controlled by feedback signals to provide a constant voltage output.

The output of the attenuator 13 is applied to an a-c amplifier 23 and the output of the a-c amplifier is applied to the feedback circuit 17. The feedback circuit 17 includes a squarer 25 and an integrator 27. The d-c output of the integrator is applied to a d-c amplifier 29 which compares the output signal from the integrator with a signal from a d-c reference source 31. The difference signal is amplified by the d-c amplifier 29 and applied to the attenuator 13. This signal is used to control the attenuator such that the output of the attenuator is held constant.

In order to derive a signal from the attenuator 13 representing the log of the a-c component, suitable connection is made to the attenuator, depending upon the particular circuitry employed therein. The output signal from the attenuator which is representative of the log of the root mean square of the statistical variations in the output of the radiation detector 11 is applied through a d-c amplifier 19 and the desired log output is obtained.

Referring now to FIG. 2, a radiation flux measuring device of the general type illustrated in FIG. 1 is illustrated in greater detail. Components of the device having function and design similar to that of FIG. 1 have been given identical reference numbers, preceded by a 1. The attenuator 113 used in the circuit of FIG. 2 is a resistive attenuator comprising generally a series resistor 133 and two variable resistors 135 and 137 connected in parallel with each other to the output side of the resistor 133. The variable resistors 135 and 137 are controlled in their value by the signal from the feedback circuit 17, which is applied thereto through two additional d-c amplifiers 129 and 139. By varying the resistance of the resistors 135 and 137, the output of the attenuator 113 is regulated to be held constant. The amount of attenuation provided by the attenuator 113 is therefore a measure of the input signal level for the rms value of the input signal or radiation flux.

A measure of the attenuation and hence of the input signal level is obtained by measuring the value of the resistors 135 and 137. If the resistors are equal in value, then the input signal level to the attenuator 113 is directly proportional to $(R/2)^{-1}$, where $R$ is the value of each resistor 135 and 137. A small d-c voltage is connected to the resistor 137 from a d-c source 141. The resistor 135 is connected to the inverting mode of a log amplifier 143. Both the log amplifier and the voltage source are a-c grounds. The input signal to the log amplifier 143 is therefore a d-c signal which is directly proportional to $(2R)^{-1}$ where $R$ is the value of each resistor 135 and 137. The output of the log amplifier 143 therefore is a logarithmic signal of the input signal and is therefore a logarithmic signal true rms output of the radiation detector 111. This signal is applied to the d-c amplifier 119, which provides channel output.

In order to make the response time of the circuit independent of the signal level of the circuit, the output of the logarithmic amplifier 143 is also fed back into the d-c amplifier 139. This provides a second feedback loop and produces the desired effect on the response time of the circuits.

In FIG. 2, the attenuation of the attenuator 113 is related directly to the rms output of the radiation detector 111. Thus, in order to provide a log output, the log amplifier 143 is incorporated. In the circuit shown in FIG. 3, an alternative device is used for the attenuator 113 which inherently produces a logarithmic output related to its input, without the need for a log amplifier.

More particularly, the radiation flux measuring device of FIG. 3 is of the same general type as that shown in FIG. 1, and components therein having similar design and function have been given identical reference numerals preceded by a 2.

Figure 4:
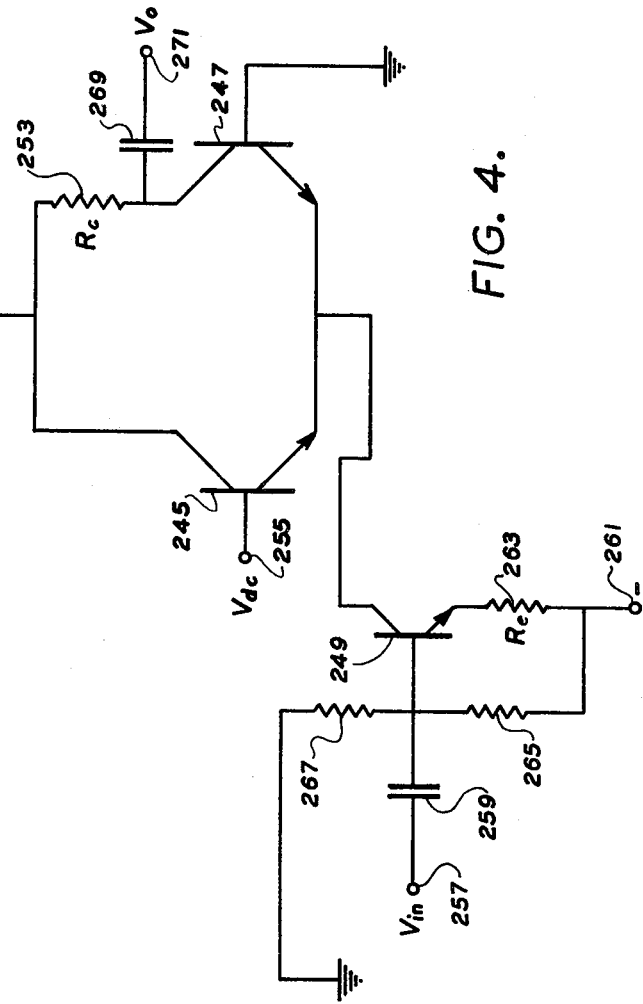
FIG. 4 is a circuit diagram illustrating one of the components utilized in the device of FIG. 3.

In the device of FIG. 3, the attenuator 213 incorporates a differential pair of transistors, illustrated more particularly in FIG. 4. The differential pair includes transistors 245 and 247, which are of the NPN type having their emitters connected to the collector of an NPN transistor 249. The collector of the transistor 245 is connected directly to a source 251 of positive potential, and the collector of the transistor 247 is connected through a resistor 253 to the source 251 of positive potential. A terminal 255 is coupled to the base of the transistor 245, and the base of the transistor 247 is grounded.

Input to the differential pair is provided from an input terminal 257 through a capacitor 259 to the base of the transistor 249. Bias for the transistor 249 is provided from a negative potential source 261 through an emitter resistor 263, and through a base resistor 265. The base of the transistor 249 is connected to ground through a resistor 267. The output signal from the differential pair is derived through an output capacitor 269 at an output terminal 271.

For the differential pair shown in FIG. 4, the output voltage at the terminal 271 is equal to the expression:

$$\frac{R_c}{R_e} \times \frac{1}{1 + e^{V/V_T}} \times V_{in}$$

where:
$R_c$ = the resistance of resistor 253,
$R_e$ = the resistance of resistor 263,
$V_{dc}$ = the d-c voltage at the terminal 255,
$V_T = (kt/q)$, and
$V_{in}$ = the input voltage at the terminal 257.
If $e^{V/V_T} >>> 1$, then the voltage out is:

$$V_o = \frac{R_c}{R_e} \times e^{-V/V_T} \times V_{in}$$

Then, if $V_o$ is held constant by varying $V_{dc}$ $$V_{in} = \frac{V_o R_e}{R_c} \times e^{\frac{V}{V_T}} = k e^{\frac{V}{V_T}}$$

Thus $V_{dc} = V_T \log_n k \, V_{in}$ namely, an output signal proportional to the log of the radiation flux.

Returning now to FIG. 3, the feedback loop 217 is used to hold the output voltage at the terminal 271 (FIG. 4) constant. In this manner, the output voltage at the terminal 255 provides a d-c voltage with the required log root mean square relationship to the input voltage at the terminal 257. The final amplifier 219 may be used for slope and off-set adjustments.

It may therefore be seen that the invention provides an improved radiation flux measuring device. The device of the invention is capable of producing an output representative of the log of the root mean square voltage of the statistical fluctuations of a radiation detector over a range of up to seven decades. The device is simple of construction and reliable of operation, and the output provided is the true root mean square log.

Various modifications of the invention in addition to those shown and described herein will become apparent to those skilled in the art from the foregoing description and accompanying drawings. Such modifications are intended to fall within the scope of the appended claims.

What is claimed is:

1. A radiation flux measuring device comprising, a radiation detector for producing an output having an a-c component representing radiation flux, a resistive attenuator and means coupling same to the output of said radiation detector, said resistive attenuator comprising a series resistor and a pair of parallel connected voltage controlled variable resistors connected to the output side of said series resistor, said resistive attenuator further including a source of d-c potential connected between a reference potential and one of said variable resistors, a log amplifier connected to the other of said variable resistors and forming a series path from said source of potential through both said variable resistors to said log amplifier, a feedback loop connected to the output of said series resistor of said attenuator for applying an error signal to said variable resistors for holding the output of said attenuator constant, said log amplifier thereby providing a log signal representative of the attenuation of said attenuator which is proportional to the log of the RMS value of the a-c component of the output of said radiation detector.

2. A radiation flux measuring device according to claim 1 including means for applying a portion of the output of said log amplifier to said feedback loop to make the response of the circuit independent of signal level.

3. A radiation flux measuring device according to claim 1 wherein said feedback loop includes a squarer, an integrator, and an error amplifier.

* * * * *

UNITED STATES PATENT AND TRADEMARK OFFICE
CERTIFICATE OF CORRECTION

PATENT NO. : 3,916,193
DATED : October 28, 1975
INVENTOR(S) : Corte and Maitra

It is certified that error appears in the above-identified patent and that said Letters Patent are hereby corrected as shown below:

Column 1, line 12 - "to" should be --for--.

Column 4, line 5 - equation should read:

$$\frac{R_c}{R_e} \times \frac{1}{1 + e^{V_{dc}/V_T}} \times V_{in}$$

Column 4, line 14 should read --If $e^{V_{dc}/V_T} \ggg 1$, then the voltage out is:--

Column 4, line 18, - equation should read:

$$V_o = \frac{R_c}{R_e} \times e^{-V_{dc}/V_T} \times V_{in}$$

Column 4, lines 23 and 24 - the equation should read:

$$V_{in} = \frac{V_o R_e}{R_c} \times e^{\frac{V_{dc}}{V_T}} = ke^{\frac{V_{dc}}{V_T}}$$

Signed and Sealed this thirteenth Day of April 1976

[SEAL]

Attest:

RUTH C. MASON
Attesting Officer

C. MARSHALL DANN
Commissioner of Patents and Trademarks